US007980193B1

(12) United States Patent
Wireman

(10) Patent No.: US 7,980,193 B1
(45) Date of Patent: Jul. 19, 2011

(54) PRESSURE LOCK MARINE HORN

(75) Inventor: Justin M. Wireman, Comstock Park, MI (US)

(73) Assignee: Brunswick Corporation, Lake Forest, IL (US)

( * ) Notice: Subject to any disclaimer, the term of this patent is extended or adjusted under 35 U.S.C. 154(b) by 144 days.

(21) Appl. No.: 12/480,842

(22) Filed: Jun. 9, 2009

(51) Int. Cl.
*G10K 9/22* (2006.01)
*B60Q 5/00* (2006.01)

(52) U.S. Cl. .............................. 116/137 R; 116/142 FP

(58) Field of Classification Search .............. 116/137 R, 116/142 R, 142 FP; 84/397; 340/387.1, 340/391.1, 404.1, 404.2, 404.3; 181/148
See application file for complete search history.

(56) References Cited

U.S. PATENT DOCUMENTS 3,477,405 A * 11/1969 Jensen ...................... 116/137 R
3,906,490 A * 9/1975 Shaw ......................... 340/391.1
4,212,001 A * 7/1980 Taira .......................... 340/391.1
4,825,800 A * 5/1989 Kitchen ............................ 116/4
4,979,219 A 12/1990 Lin
5,099,220 A * 3/1992 Camarota .................. 340/387.1
5,345,852 A * 9/1994 Takahashi et al. .............. 84/397
6,139,170 A 10/2000 Wiggerman
7,617,794 B2 * 11/2009 Chlystek ................... 116/137 R
2004/0246110 A1 * 12/2004 Di Giovanni et al. ..... 340/388.1

FOREIGN PATENT DOCUMENTS

EP 337067 A2 * 10/1989
EP 2065884 A2 * 6/2009
JP 63027784 A * 2/1988
JP 2010175981 A * 8/2010
JP 2010181599 A * 8/2010

* cited by examiner

*Primary Examiner* — R. A. Smith

(74) *Attorney, Agent, or Firm* — Andrus, Sceales, Starke & Sawall, LLP

(57) ABSTRACT

A marine horn has a horn path with a pressure lock chamber blocking water which has ingressed the horn outlet mouth from reaching the sound source along the horn path.

6 Claims, 2 Drawing Sheets

PRESSURE LOCK MARINE HORN

BACKGROUND AND SUMMARY

The invention relates to marine horns.

Marine horns should meet certain government and marine industry standards, including acoustical performance, including emitted sound pressure levels. The horn should also be protected against water inrush, to protect the sound source, such as a disk electromagnet oscillating diaphragm, piezoelectric transducer, etc. Placing a cloth-like membrane over the mouth of the horn may repel water before it enters the horn, however this lowers sound pressure level.

The present invention arose during development efforts directed toward the above technology.

DETAILED DESCRIPTION

Figure 1:
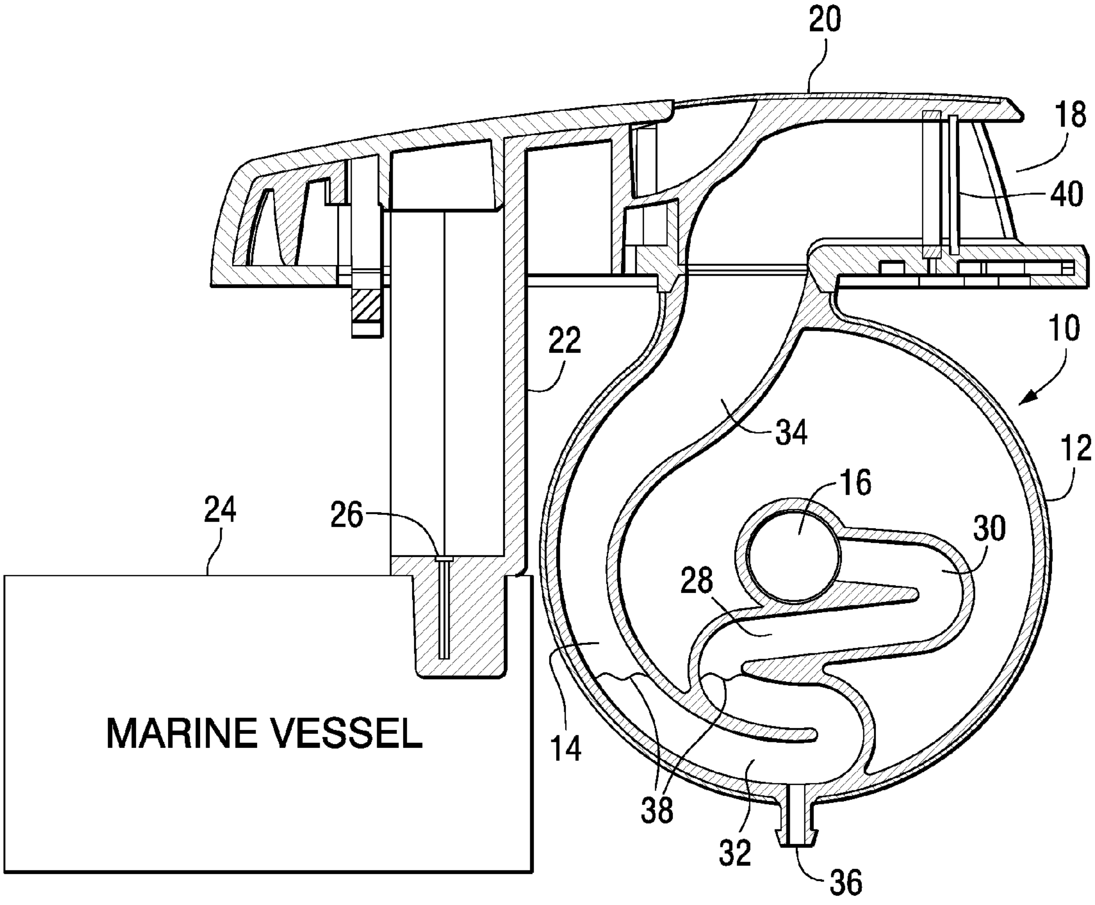
FIG. 1 is a side sectional view of a marine horn in accordance with the invention.
Figure 2:
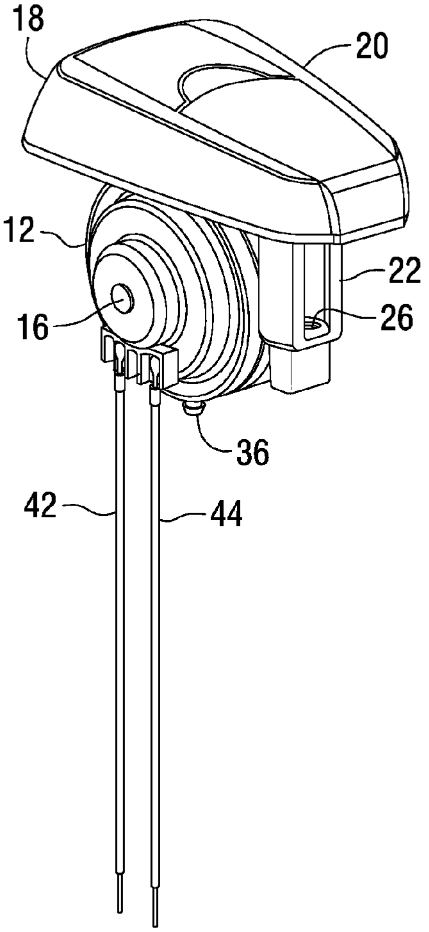
FIG. 2 is a perspective view of the marine horn of FIG. 1.
Figure 3:
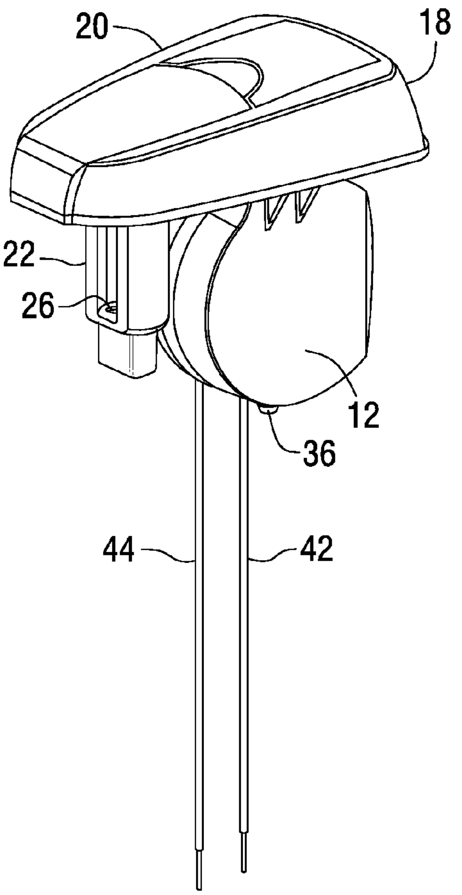
FIG. 3 is another perspective view of the marine horn of FIG. 1.

FIGS. 1-3 show a marine horn 10 including a housing 12 having a horn path 14 from a sound source 16 to an outlet 18. The sound source may be a disk electromagnet oscillating diaphragm, a piezoelectric transducer, etc., as known in the art. The housing may have a cover 20 and be part of a lamp base 22 mounted to a marine vessel 24, which lamp base may have a socket 26 for receiving a light bulb, as known.

Marine horn path 14 has a pressure lock chamber 28 blocking water which has ingressed outlet 18 from reaching sound source 16 along horn path 14. The horn path is a tortuous path extending from a first upper segment 30 at sound source 16 to a lower segment 32 and then to a second upper segment 34 at outlet 18. Lower segment 32 is gravitationally below each of the first and second upper segments 30 and 34. Pressure lock chamber 28 is between lower segment 32 and first upper segment 30. The housing has a water drain port 36 at lower segment 32 draining water therefrom. High pressure and/or high speed water ingresses outlet 18 and flows to lower segment 32, as shown at water line 38, and compresses air in the horn path until stopped by pressure lock, whereafter the water drains through water drain port 36 from lower segment 32. Lower segment 32 collects the water which has ingressed outlet 18, which water at a given level spans transversely across the horn path and closes and pressure locks the section of the horn path from such given water level to sound source 16 and provides pressure lock chamber 30 therebetween. In the preferred embodiment, horn path 14 is a spiral trumpet horn path, which may include one or more reverse turns as shown. In a further embodiment, an acoustically permeable membrane 40 may cover outlet 18 and block some water, including low pressure water and low speed water, from ingressing the outlet. A pair of electrical conductor wires 42, 44 provide electrical power for sound source 16.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A marine horn comprising a housing having a horn path from a sound source to an outlet, said horn path having a pressure lock chamber blocking water which has ingressed said outlet from reaching said sound source along said horn path, wherein said horn path is a tortuous path extending from a first upper segment at said sound source to a lower segment and then to a second upper segment at said outlet, said lower segment being gravitationally below each of said first and second upper segments, said pressure lock chamber being between said lower segment and said first upper segment, wherein said outlet is gravitationally above said lower segment and second upper segment, such that water ingressing said outlet flows gravitationally downhill to said second upper segment and said lower segment without climbing uphill to said second upper segment nor said lower segment.

2. The marine horn according to claim 1 wherein said housing has a water drain port at said lower segment draining water therefrom, wherein said outlet is gravitationally above said water drain port.

3. The marine horn according to claim 2 wherein water ingresses said outlet and flows to said lower segment and compresses air in said horn path until stopped by pressure lock, whereafter water drains through said water drain port from said lower segment.

4. The marine horn according to claim 1 wherein said horn path is a spiral trumpet horn path.

5. The marine horn according to claim 1 wherein said lower segment collects water which has ingressed said outlet, which water at a given level spans transversely across said horn path and closes and pressure locks the section of said horn path from said given level to said sound source and provides said pressure lock chamber therebetween.

6. The marine horn according to claim 1 comprising an acoustically permeable membrane covering said outlet and blocking some water, including at least one of low pressure water and low speed water, from ingressing said outlet.

* * * * *